Sept. 27, 1955     A. E. BASTON     2,718,814
IMAGE PROJECTION DEVICE
Filed Dec. 6, 1952     2 Sheets-Sheet 1
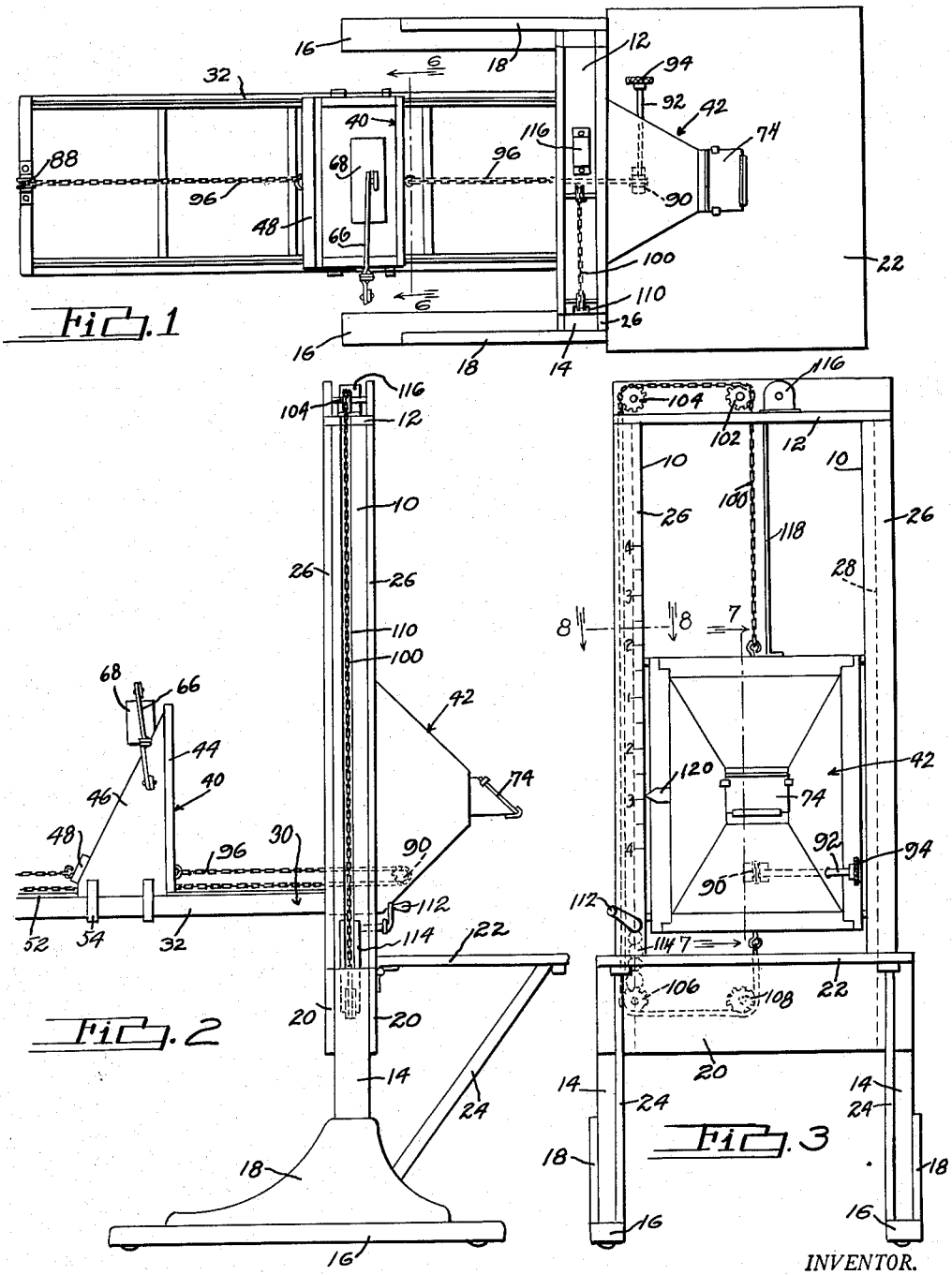
INVENTOR.
ALFRED E. BASTON
BY
HIS ATTORNEY Sept. 27, 1955　　　A. E. BASTON　　　2,718,814
IMAGE PROJECTION DEVICE
Filed Dec. 6, 1952　　　　　　　　　　　　2 Sheets-Sheet 2
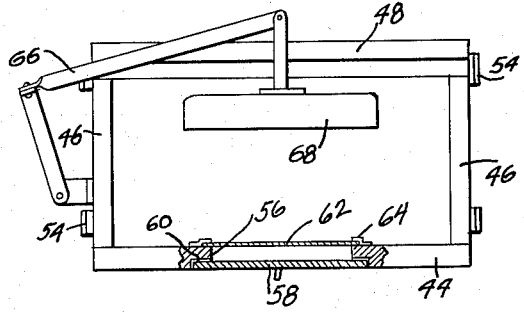
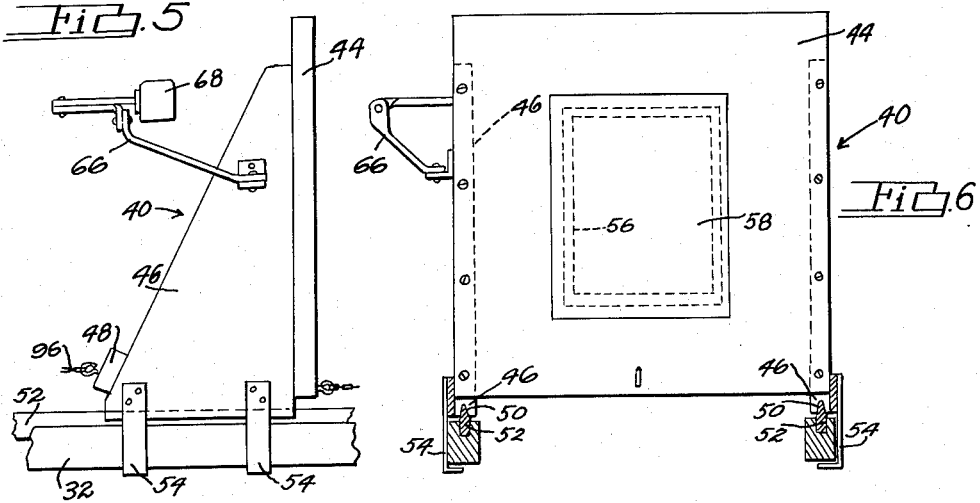
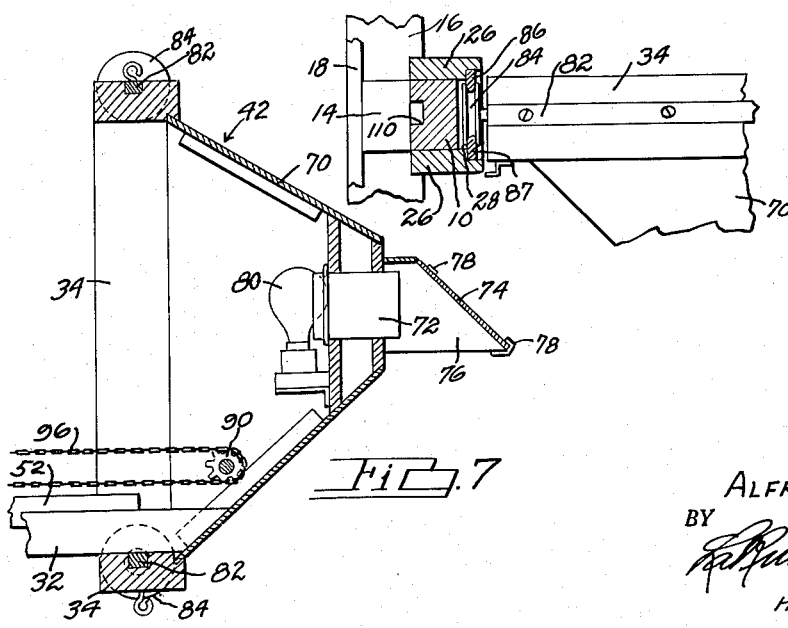
INVENTOR.
ALFRED E. BASTON
BY
HIS ATTORNEY

United States Patent Office 2,718,814
Patented Sept. 27, 1955

2,718,814

IMAGE PROJECTION DEVICE

Alfred E. Baston, Detroit, Mich.

Application December 6, 1952, Serial No. 324,445

1 Claim. (Cl. 88—24)

This invention relates to an image projection device and more particularly to a projection device wherein the image is projected directly to a drawing board whereby the artist may reproduce the image on the drawing board without the necessity of making photographs or photostats to be used in reproducing the image.

It is an object of the present invention to provide a supporting frame structure having a movable carriage including a vertically adjustable projection device and an object supporting portion, and to provide adjustable means for varying the spacing between the projection device and the object supporting portion.

Another object of the invention is to provide an adjustable device wherein the size of the projected image may be varied, either reduced or enlarged in size.

A further object of the invention is to provide guide means for the movable parts of the device and to provide counterbalancing means for the movable parts whereby the device is easily adjustable for obtaining proper focus of the image and the desired size of the projected image.

Other objects and advantages of the invention will more fully appear from the following description taken in connection with the accompanying drawings in which:

Fig. 1 is a top plan view of my improved device;

Fig. 2 is a side elevational view of Fig. 1, a portion thereof being broken away;

Fig. 3 is a front elevational view of Fig. 2;

Fig. 4 is an enlarged top plan view of the copy board for receiving the object which is to be projected;

Fig. 5 is a side elevational view of Fig. 4;

Fig. 6 is a front elevational view of Fig. 5 and an enlarged sectional view taken on line 6—6 of Fig. 1;

Fig. 7 is an enlarged sectional view taken on line 7—7 of Fig. 3, showing the projection device; and Fig. 8 is an enlarged fragmentary view taken on line 8—8 of Fig. 3.

Referring to the drawings, I have shown a frame structure including vertical side members 10 connected at their upper ends by a transverse header 12. The lower ends of the side members 10 are extended by legs 14 secured to the outer surfaces of the side members 10. Transverse supports 16 are attached to the lower ends of the extension legs 14 and brace members 18 tie the legs 14 to the supports 16. Transverse braces 20 are secured to the front and back faces of the overlapping ends of the side members 10 and the legs 14. A drawing board 22 is hinged to the front face of the frame assembly and is supported in a horizontal position by diagonal braces 24 removably positioned between the legs 14 and the under surface of the drawing board 22. Guide plates 26 are secured to the front and rear faces of the side members 10 and extend inwardly beyond the inner faces of the side members 10 forming a guide channel 28, more clearly shown in Fig. 8.

A vertically movable carriage 30, having a lower horizontal frame 32, formed by longitudinal and transverse members, and a vertically extending rectangular frame 34, is vertically slidable in the guide channel 28. The carriage 30 comprises a horizontally movable copy board unit 40 slidably mounted or the horizontal frame 32, and a projector unit 42 carried by the rectangular frame 34.

The copy board unit 40 includes a vertical plate 44 having side brace members 46 secured to the rear face of the plate 44 and a transverse connection 48. The bottom edges of the brace members 46 are provided with a groove 50 which receives a track 52 carried by the horizontal frame 32. Angular clips 54 are carried by the brace members 46 having a portion under the frame 32 for guiding the horizontal movement of the copy board unit 40 and for retaining the track 52 in the groove 50. A rectangular opening 56 is formed in the center of the plate 44 covered by a removable board 58 in a recess 60 on the front side of the plate 44. The rear face of the plate 44 is provided with a translucent panel 62 held in position for covering the opening 56 by clips 64. A lamp bracket 66 is secured to one of the side braces 46 and is adapted to be swung to a position in front of the plate 44 or to a position in back of the plate 44. A light 68 is carried by the outer end of the bracket 66 and is adapted to reflect light through the translucent panel 62, when the board 58 is removed. When the bracket 66 is swung to the front side of the plate 44, the light is reflected on the front face of the board to which the copy work is applied.

The projector unit 42 includes the rectangular frame 34 to which is secured a forwardly projecting hood 70 formed by outward tapered sides, top and bottom walls. A lens 72 is centrally positioned in the outer end of the hood 70 in a line substantially horizontal with the center of the opening 56 in the plate 44. A mirror 74 is positioned forwardly of the lens 72 on an angle of forty-five degrees for reflecting the light rays through the lens 72 vertically downwardly on the drawing board 22. The mirror 74 is held on side members 76 by clips 78. At the opposite sides of the lens 72 and within the hood 70, I have provided light bulbs 80. These bulbs are to be used when the copy board is in close proximity to the rear face of the hood 70 when it is not practical to use the light 66 in its forwardly swung position.

The rectangular frame 34 has a cross bar 82 along its upper and lower frame members which carry grooved rollers 84 at the opposite side faces of the frame 34. Track members 86 and 87 are secured to the inner faces of the guide plates 26, forming the groove 28, and are received in the groove of the rollers 84. There is sufficient clearance between the diameter of the rollers and the spacing between the oppositely disposed tracks 86 and 87 to prevent a binding action on the rollers by the track which does not carry the load; that is, the overhang of the frame 32 causes the pressure of the rectangular frame 34 to bring the upper rollers into rolling engagement with the rear track 86, the front track 87 serving as a lateral guide, and the lower rollers are in rolling engagement with the front track 87, the rear track 86 serving as a lateral guide.

As previously explained, the copy board unit 40 is horizontally slidable toward and away from the projection unit 42 along the track 52. A sprocket 88 is carried by the carriage 30 at the outer rear end of the frame 32 and a sprocket 90 is carried by the forward end of the frame 32. The sprocket 90 is keyed to a shaft 92 which is turned by a hand wheel 94. A chain 96, having one end attached to the front face of the copy board, passes over the sprocket 90, extends rearwardly beneath the copy board, over the sprocket 88, and forwardly to the transverse connection 48 on the copy board 40. Thus, by turning the hand wheel 94 the operator can move the copy board 40 toward or away from the projection unit 42.

The carriage 30 comprises the copy board unit 40 and projection unit 42. These are vertically movable between the side frame members 10. A chain 100, having its opposite ends secured respectively to the top and bottom surfaces of the rectangular frame 34, extends around idler pulley 102, idler pulley 104, driving pulley 106, and idler pulley 108. That portion of the chain 100 between idler pulley 104 and driving pulley 106 is received in a slot 110 in the outer surface of the side frame member 10. Since it is desirable to have the driving pulley below the lowest point of travel of the carriage 30, and the control above the drawing board 22, I have arranged a crank 112 above the board 22 connected to the driving gear 106 by a belt or as shown a gear train 114. Thus, by turning the crank 112, the operator can move the projection unit 42 with the copy board 40, toward or away from the drawing board 22.

As a means for counterbalancing the weight of the carriage 30, I have provided a coiled spring tension unit 116 having a tape 118 connected to the upper surface of the frame 34.

The front face of one of the guide plates 26 has graduations thereon and the frame 34 is provided with a pointer 120 for indicating the position of the projection unit 42.

From the above it will be clearly understood that I have provided a structure which projects an image directly to the drawing board so that the operator can copy the image. The image can be projected full size, enlarged, or reduced. A proper focus of the image may be obtained by positioning the copy board with respect to the projection unit.

It will be understood that various changes including the size, shape, and arrangement of parts may be made without departing from the spirit of my invention and it is not my intention to limit its scope other than by the terms of the appended claim.

I claim:

An image projection device comprising, a supporting frame, a carriage frame including a vertically extending portion and a horizontally extending portion projecting rearwardly from the base of the vertically extending portion, a vertically extending track carried by said supporting frame for guiding the vertically extending portion, a horizontally disposed track carried by the horizontally extending portion, a copy board guided by said horizontally extending track for movement toward and away from the vertically extending portion of said carriage frame, a hood carried by the vertically extending portion of said carriage frame and arranged on the side of the carriage frame opposite to the horizontally extending portion thereof, a drawing board carried by said supporting frame below said carriage frame, a lens in said hood, a reflecting mirror carried by said hood for reflecting light rays from said lens to said drawing board, means above said drawing board for vertically moving said carriage frame, means on the hood side of said carriage frame for horizontally moving said copy board, and means for counterbalancing the weight of said carriage frame.

References Cited in the file of this patent

UNITED STATES PATENTS

| | | |
|---|---|---|
| 1,724,866 | Allison | Aug. 13, 1929 |
| 1,834,897 | Caps | Dec. 1, 1931 |
| 2,053,073 | Gardner | Sept. 1, 1936 |